United States Patent
Ziemek et al.

[11] 3,754,094
[45] Aug. 21, 1973

[54] CABLE WITH WELDED CORRUGATED METAL SHEATH

[75] Inventors: Gerhard Ziemek; Gert Nordmann, both of Hannover, Germany

[73] Assignee: Habel-un Metallwerke Gutehoffnungshutte Aktiengesellschaft, Hannover, Germany

[22] Filed: Oct. 3, 1972

[21] Appl. No.: 294,626

Related U.S. Application Data
[62] Division of Ser. No. 109,099, Jan. 25, 1971, Pat. No. 3,710,828.

[52] U.S. Cl. ............ 174/102 A, 174/36, 174/102 D
[51] Int. Cl. ................................................ H01b 7/22
[58] Field of Search .................. 174/102 R, 102 D, 174/106 D, 36, 102 A, 68 R; 138/118, 121, 122, 128, 170, 171; 75/123 R, 123 L

[56] References Cited
UNITED STATES PATENTS

| | | | |
|---|---|---|---|
| 3,667,506 | 6/1972 | Jocteur | 174/102 D |
| 3,634,606 | 1/1972 | Iyengar | 174/102 D |
| 3,557,301 | 1/1971 | Priaroggia | 174/102 D |
| 3,579,313 | 5/1971 | Pryor et al. | 174/102 A |

*Primary Examiner*—Bernard A. Gilheany
*Assistant Examiner*—A. T. Grimley
*Attorney*—Philip G. Hilbert

[57] ABSTRACT

A tubular metal cable sheath formed from a steel tape converted to tubular shape with the side edges thereof in abutting relation to provide a longitudinal seam which is welded. The tubing may be transversely corrugated to increase the flexibility thereof; the tubing in plain or corrugated form being useful as conduit means or as sheathing for electrical cable. The steel from which the tape is formed has a specified carbon, manganese and silicon content to improve diverse properties of the fabricated tubing, including the welded seam thereof and the welding procedure.

7 Claims, 4 Drawing Figures

Patented Aug. 21, 1973
3,754,094
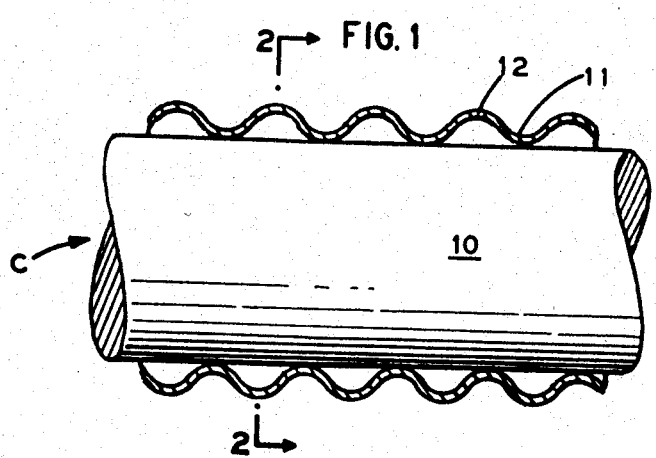
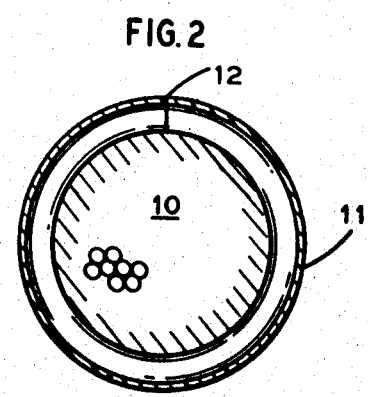
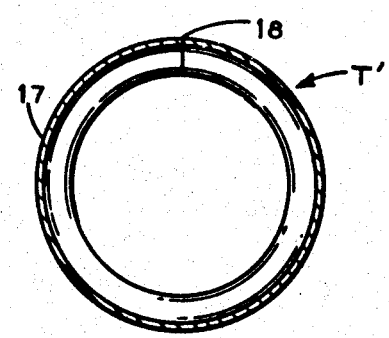
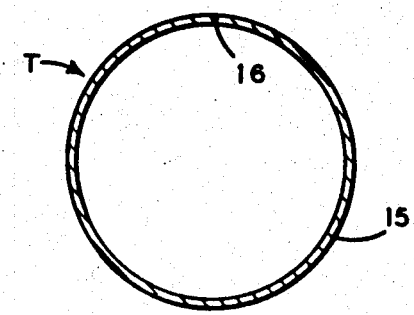

CABLE WITH WELDED CORRUGATED METAL SHEATH

This is a division of application Ser. No. 109,099, filed Jan. 25, 1971 now U.S. Pat. No. 3,710,828.

Steel sheath is commonly used in the manufacture of electrical cables, usually replacing lead sheath. Such sheath is formed from a steel tape which is continuously formed about the cable core, to tubular form with a longitudinally extending butt seam which is continuously welded and then corrugated to provide flexibility for the cable as a whole.

Also, tubing for the transport of liquids or gases, is also formed from steel tape which is converted to tubular form and the longitudinal seam is welded. A second tubing similarly formed may be disposed in coaxial relation to the first tubing, the annular space between the tubings being continuously filled with a suitable insulating material such as a self foaming resin; the resin being introduced into the annular space immediately before the seam of the outer tubing is welded. Both tubings may be corrugated to increase their flexibility.

In fabricating such tubings, particularly those which are corrugated, the steel tape must have special properties. Thus the tape must lend itself to deep drawing, cold ductility for bending the tubing, and must show in the seam weld area resistance to cracking despite deformation as in flexing.

It has been suggested that tapes for such purposes be formed from killed cast steel, which includes deoxidants such as silicon and aluminum. While the deep drawing characteristic of such steel is somewhat reduced, it has other favorable properties. Thus, the fine structure of the killed steel and its resistance to coarsening the grain after the welding operation, the weldment zone remains substantially unaffected by the welding operation, and in contrast with rimmed steel, it retains its drawing properties and is readily deformed in the subsequent corrugating operation.

However, such known steel sheath has a disadvantage in that element segregation occurs during casting and particularly at the edges, producing local enrichments of sulfur, phosphorus, carbon and the like. These contaminants render the metal somewhat non-homogeneous, which in turn reduces the welding speed.

Accordingly, an object of this invention is to provide tubular metal structures, which may be of the corrugated type, for use as cable sheath or conduits, which is derived from a steel having selected modifying constituents which provides a high strength weldment area of high flexibility, and further permits fabricaton of the structures at high speeds.

Another object of this invention is to provide tubular metal structures of the character described, wherein the steel is of the vacuum degassed type having a determined content of carbon, manganese and silicon.

Other objects of the invention will in part be obvious and in part hereinafter pointed out.

DESCRIPTION OF THE DRAWING

FIG. 1 is a longitudinal view of an electrical cable having a corrugated steel sheath embodying the invention;

FIG. 2 is a transvers section thereof taken on line 2—2 of FIG. 1;

FIG. 3 is a transverse sectional view showing another embodiment of the invention; and FIG. 4 is a transverse sectional view showing a further embodiment of the invention.

DESCRIPTION OF THE PREFERRED EMBODIMENTS

As shown in FIGS. 1, 2, C designates a sheathed cable embodying the invention. The same comprises a conventional electrical cable core 10 over which is formed assteel sheath 11. Such sheath is derived from a tape extending longitudinally and converted to tubular form about core 10, to provide a longitudinally welded seam, all in a manner known in the art. The sheath 11 is then transversely corrugated, in a known manner, to provide a sheathed cable having good flexibility.

It has been found that the tape from which sheath 11 is formed, shows optimum properties, in respect to flexibility, homogeneous weldment area and high speed seam welding, when the same includes at most 0.05 percent and preferably 0.03 percent carbon; a manganese content of from 0.3 to 1.0 percent, preferably 0.35 percent; and a silicon content of less than 0.02 percent together with a small amount of aluminum. The steel is preferably of the vacuum degassed type, thereby reducing slag formation to a minimum.

Thus, a steel tape made of a steel with 0.03 percent carbon, traces of silicon, 0.35 percent manganese and 0.05 percent aluminum, showed excellent properties. Such material showed a mean elastic limit of 19.7 $kp/mm^2$ and a mean Vickers hardness of 93 $kp/mm^2$ and had good deforming properties.

With the foregoing steel tape, reduced current values may be used in the welding operation, the tape having a thickness of 0.4 mm. The average increase in welding speed is evidenced in one case with an increase from 9 meters/min. to more then 13 meters/min. However, the average increase in welding speed is about 30 percent.

The welding process used may be of the direct current-arc welding type under a protective argon atmosphere; together with multiple welding electrodes in tandem relation. Thus, with two electrodes in longitudinal succession, a welding speed of 19–20 meters/min. was achieved. In such cases, the guidance of the tape edges to the welding station must be of high precision, suitable guidance means being used for the purpose.

Alternatively, the steel tape of the instant invention may be used to form tubing T for conduit purposes, the same being derived from tape 15 converted to tubular shape with a longitudinal weld seam 16. Also, tubing T', also formed from steel tape as set forth above, is corrugated as indicated at 17, after being welded as at 18, FIG. 4.

The steel tapes of the instant invention may have a thickness ranging from 0.2 mm. to 1.0 mm. The percentages of steel constituents are all by weight.

We claim:

1. An electrical cable comprising a cable core and a tubular sheath for said core, said sheath comprising a thin metal tape converted to tubular form with a longitudinally extending welded seam joining the adjacent tape edges, said tape being of steel containing from 0.03 percent to 0.05 percent carbon, 0.3 percent to 1.0 percent manganese and less then 0.02 percent silicon, all by weight, said welded seam having high cold ductility.

2. An electrical cable as in claim 1 wherein said steel further includes 0.05 percent aluminum by weight.

3. A cable as in claim 1 wherein said sheath is transversely corrugated.

4. A cable as in claim 1 wherein said tape has a thickness of from about 0.2 mm to about 1.0 mm.

5. A cable as in claim 1 wherein the carbon content is 0.03 percent and the manganese content is 0.35 percent, all by weight.

6. A cable as in claim 1 wherein said tape has a thickness of 0.4 mm.

7. A cable as in claim 1 wherein said tape is formed of vacuum degassed steel.

* * * * *